United States Patent
Li et al.

(10) Patent No.: US 10,863,309 B2
(45) Date of Patent: Dec. 8, 2020

(54) MESSAGE SENDING METHOD IN LOCAL AREA NETWORK, LOCAL AREA NETWORK GATEWAY, AND WEARABLE DEVICE

(71) Applicant: Huawei Technologies Co., Ltd., Shenzhen, Guangdong (CN)

(72) Inventors: Yan Li, Shenzhen (CN); Yu Zhu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 275 days.

(21) Appl. No.: 15/566,654

(22) PCT Filed: Apr. 15, 2015

(86) PCT No.: PCT/CN2015/076615
§ 371 (c)(1),
(2) Date: Oct. 13, 2017

(87) PCT Pub. No.: WO2016/165083
PCT Pub. Date: Oct. 20, 2016

(65) Prior Publication Data
US 2018/0084385 A1  Mar. 22, 2018

(51) Int. Cl.
*H04W 4/02* (2018.01)
*H04M 1/725* (2006.01)
(Continued)

(52) U.S. Cl.
CPC ............ *H04W 4/025* (2013.01); *G06F 3/017* (2013.01); *H04L 51/06* (2013.01); *H04M 1/57* (2013.01);
(Continued)

(58) Field of Classification Search
CPC ..... H04W 4/025; H04W 76/11; H04W 88/16; H04L 51/06; H04L 12/2803; H04L 67/14;
(Continued)

(56) References Cited

U.S. PATENT DOCUMENTS 5,479,408 A   12/1995 Will
5,960,367 A    9/1999 Kita
(Continued)

FOREIGN PATENT DOCUMENTS

CN        1165598 A       11/1997
CN      101156188 A        4/2008
(Continued)

OTHER PUBLICATIONS

Huang Tian-shu et al.; "GPRS Technology and Its Application in the Wearable Computers"; Instrument Technology, vol. 1; Jan. 31, 2005; 4 pages.

*Primary Examiner* — Patrice L Winder
*Assistant Examiner* — Lam H Duong
(74) *Attorney, Agent, or Firm* — Kilpatrick Townsend & Stockton LLP

(57) ABSTRACT

A method includes: after receiving a service request that is sent by a first device connected in a local area network and that includes a called object identifier and a service type, sending, by a local area network gateway, a prompt message including a list of second devices supporting the service type to a wearable device corresponding to the called object identifier, then obtaining information about a second device selected by a user by using the wearable device, and establishing a communication connection that is between the first device and the second device and that supports the service type, so that the first device communicates with the second device.

9 Claims, 5 Drawing Sheets

(51) Int. Cl.
*H04M 1/57* (2006.01)
*H04W 76/11* (2018.01)
*G06F 3/01* (2006.01)
*H04L 12/58* (2006.01)
*H04W 88/16* (2009.01)
*H04L 12/28* (2006.01)
*H04L 29/08* (2006.01)

(52) U.S. Cl.
CPC ......... *H04M 1/725* (2013.01); *H04M 1/7253* (2013.01); *H04W 76/11* (2018.02); *H04W 88/16* (2013.01); *H04L 12/2803* (2013.01); *H04L 67/06* (2013.01); *H04L 67/14* (2013.01)

(58) Field of Classification Search
CPC ............. H04L 67/06; H04L 29/08117; H04M 1/7253; H04M 1/57; H04M 1/725; G06F 3/017
USPC .......................................................... 709/227
See application file for complete search history.

(56) References Cited

U.S. PATENT DOCUMENTS

| | | | |
|---|---|---|---|
| 10,250,707 B2* | 4/2019 | Mei | H04W 4/12 |
| 2002/0187777 A1* | 12/2002 | Osterhout | H04M 3/54 455/417 |
| 2005/0220095 A1* | 10/2005 | Narayanan | H04L 63/126 370/389 |
| 2006/0208878 A1 | 9/2006 | Nowlan | |
| 2010/0087144 A1* | 4/2010 | Korenshtein | H04B 17/318 455/41.2 |
| 2013/0136089 A1* | 5/2013 | Gillett | H04W 72/048 370/329 |
| 2013/0171965 A1 | 7/2013 | Schrecker | |
| 2014/0173025 A1* | 6/2014 | Killick | H04N 21/462 709/217 |
| 2015/0031397 A1 | 1/2015 | Jouaux et al. | |
| 2016/0057567 A1* | 2/2016 | Nakagawa | H04B 5/0031 455/41.1 |
| 2016/0227511 A1 | 8/2016 | Shan et al. | |
| 2016/0357265 A1* | 12/2016 | Maani | G06F 3/014 |

FOREIGN PATENT DOCUMENTS

| | | |
|---|---|---|
| CN | 104199071 A | 12/2014 |
| CN | 104301456 A | 1/2015 |
| CN | 104471921 A | 3/2015 |

* cited by examiner

MESSAGE SENDING METHOD IN LOCAL AREA NETWORK, LOCAL AREA NETWORK GATEWAY, AND WEARABLE DEVICE

CROSS REFERENCE TO RELATED APPLICATIONS

The present application is a National Stage of International Application No. PCT/CN2015/076615 filed Apr. 15, 2015 which is incorporated herein by reference in its entirety.

TECHNICAL FIELD

The present invention relates to the communications field, and in particular, to a message sending method in a local area network, a local area network gateway, and a wearable device.

BACKGROUND

In an environment of a local area network, if an area for activities is relatively large, for example, when a family house is relatively large (especially a villa and a duplex apartment), the house usually has multiple rooms. When being at home, family members are usually scattered in different rooms. The family members usually interact with each other. For example, a mother who is cooking in a kitchen wants to say something to a child who is playing in a living room, or a father who is resting in a bedroom wants to ask the mother for a cup of tea. Because the family house is relatively large, to interact with each other, the family members need to talk loudly, or need to enter a same room to talk. For example, the mother who is cooking leaves the kitchen to talk to the child in the living room. In such scenarios, there are problems as follows: 1. Loud talk bothers other people; 2. In some scenarios, for example, a scenario of cooking, it is not very convenient to move to another room; 3. It is also not very convenient when a family member needs to search all the rooms for one room another family member is in. For another example, in a scenario of an office, people are scattered in different workspaces. Because a local area network of the office occupies a relatively large area, sometimes office workers need to walk around to interact with other office workers. However, an office worker does not know whether a target worker is in the workplace.

Currently, a call connection may be established with a called party by calling a communications device carried by the called party, to interact with the called party. Alternatively, in a conventional smart home and office area, extension telephones are installed in different rooms. When a calling party wants to call a called party, when knowing a location of the called party, the calling party may call an extension telephone in a room the called party is in.

However, in actual application, in a scenario of a local area network, because a calling party usually cannot determine whether a called party carries a communications device and does not know a location of the called party, a case in which the calling party makes multiple call attempts but fails to find the called party often occurs.

SUMMARY

Embodiments of the present invention provide a message sending method in a local area network, a local area network gateway, and a wearable device, so as to intelligently and accurately establish service communication between a member of a local area network and a called party when the member of the local area network is unclear about whether the called party carries a communications device and does not know a location of the called party.

A first aspect of the embodiments of the present invention provides a message sending method in a local area network, including:

receiving, by a local area network gateway, a service request sent by a first device connected in a local area network, where the service request includes at least a called object identifier and a service type;

sending, by the local area network gateway, a prompt message to a wearable device corresponding to the called object identifier, where the prompt message includes a list of second devices supporting the service type;

obtaining, by the local area network gateway, information about a second device that is selected by a user by using the wearable device; and establishing, by the local area network gateway, a communication connection that is between the first device and the second device and that supports the service type, so that the first device communicates with the second device.

With reference to the first aspect of the embodiments of the present invention, in a first implementation manner of the first aspect of the embodiments of the present invention, before the step of receiving, by a local area network gateway, a service request sent by a first device connected in a local area network, further includes:

storing, by the local area network gateway, information about a registered wearable device, where the information about the wearable device includes identifier information of the wearable device and identifier information of a corresponding user; and obtaining, by the local area network gateway, location information, capability information, and status information of one or more devices connected in the local area network, where the location information indicates a current location, the capability information indicates a supported service type, and the status information indicates a current online state and/or use state.

With reference to the first aspect or the first implementation manner of the first aspect of the embodiments of the present invention, in a second implementation manner of the first aspect of the embodiments of the present invention, the sending, by the local area network gateway, a prompt message to a wearable device corresponding to the called object identifier specifically includes:

determining, by the local area network gateway, status information of the wearable device corresponding to the called object identifier; and sending, by the local area network gateway, the prompt message to the wearable device corresponding to the called object identifier when the status information of the wearable device corresponding to the called object identifier is being used.

With reference to any one of the first aspect to the second implementation manner of the first aspect of the embodiments of the present invention, in a third manner of the first aspect of the embodiments of the present invention, after the step of receiving, by a local area network gateway, a service request sent by a first device connected in a local area network and before the step of sending, by the local area network gateway, a prompt message to a wearable device corresponding to the called object identifier, further includes:

adding, by the local area network gateway to the list of second devices, a device that is located within a first preset range of the wearable device corresponding to the called object identifier, that supports the service type, and that is online.

With reference to any one of the first aspect to the third implementation manner of the first aspect of the embodiments of the present invention, in a fourth manner of the first aspect of the embodiments of the present invention, the service type includes at least one of call, picture transmission, or video transmission.

With reference to any one of the first aspect to the fourth implementation manner of the first aspect of the embodiments of the present invention, in a fifth manner of the first aspect of the embodiments of the present invention, the obtaining, by the local area network gateway, information about a second device that is selected by a user by using the wearable device specifically includes:

receiving, by the local area network gateway, identifier information of the second device that is sent by the wearable device corresponding to the called object identifier; or receiving, by the local area network gateway, a service obtaining request sent by the second device, where the service obtaining request includes identifier information of the wearable device corresponding to the called object identifier.

With reference to any one of the first aspect to the fifth implementation manner of the first aspect of the embodiments of the present invention, in a sixth manner of the first aspect of the embodiments of the present invention, the establishing, by the local area network gateway between the first device and the second device, a communication connection that supports the service type specifically includes:

establishing, by the local area network gateway between the first device and the second device, a P2P connection that supports the service type; or forwarding, by the local area network gateway, data corresponding to the service type between the first device and the second device.

A second aspect of the embodiments of the present invention provides a message sending method in a local area network, including:

receiving, by a wearable device, a prompt message from a first device, where the prompt message includes a list of second devices supporting a specific service type;

receiving, by the wearable device, an operation instruction of a user;

determining, by the wearable device, a second device selected by the operation instruction; and sending, by the wearable device, identifier information of the selected second device to the first device, so that the first device establishes a communication connection supporting the specific service type to the second device; or sending, by the wearable device, identifier information of the selected second device to a local area network gateway, so that the local area network establishes a communication connection that is between the first device and the second device and that supports the specific service type; or sending, by the wearable device, information about the first device and information about the specific service type to the second device, so that the second device sends a service request to a local area network gateway or the first device to establish a communication connection that is between the first device and the second device and that supports the specific service type.

With reference to the second aspect of the embodiments of the present invention, in a first implementation manner of the second aspect of the embodiments of the present invention, the operation instruction includes: a gesture instruction for the wearable device, or making the wearable device approach or touch another device.

A third aspect of the embodiments of the present invention provides a local area network gateway, including:

a first receiving module, configured to receive a service request sent by a first device connected in a local area network, where the service request includes at least a called object identifier and a service type;

a first sending module, configured to send a prompt message to a wearable device corresponding to the called object identifier, where the prompt message includes a list of second devices supporting the service type;

a first obtaining module, configured to obtain information about a second device that is selected by a user by using the wearable device; and an establishment module, configured to establish a communication connection that is between the first device and the second device and that supports the service type, so that the first device communicates with the second device.

With reference to the third aspect of the embodiments of the present invention, in a first implementation manner of the third aspect of the embodiments of the present invention, the local area network gateway further includes:

a storage module, configured to store information about a registered wearable device, where the information about the wearable device includes identifier information of the wearable device and identifier information of a corresponding user; and a second obtaining module, configured to obtain location information, capability information, and status information of one or more devices connected in the local area network, where the location information indicates a current location, the capability information indicates a supported service type, and the status information indicates a current online state and/or use state.

With reference to the third aspect or the first implementation manner of the third aspect of the embodiments of the present invention, in a second implementation manner of the third aspect of the embodiments of the present invention, the first sending module specifically includes:

a determining unit, configured to determine status information of the wearable device corresponding to the called object identifier; and a sending unit, configured to send the prompt message to the wearable device corresponding to the called object identifier when the determining unit determines that the status information of the wearable device corresponding to the called object identifier is being used.

With reference to any one of the third aspect to the second implementation manner of the third aspect of the embodiments of the present invention, in a third manner of the third aspect of the embodiments of the present invention, the local area network gateway further includes:

a list determining module, configured to add, to the list of second devices, a device that is located within a first preset range of the wearable device corresponding to the called object identifier, that supports the service type, and that is online.

With reference to any one of the third aspect to the third implementation manner of the third aspect of the embodiments of the present invention, in a fourth manner of the third aspect of the embodiments of the present invention, the service type includes at least one of call, picture transmission, or video transmission.

With reference to any one of the third aspect to the fourth implementation manner of the third aspect of the embodiments of the present invention, in a fifth manner of the third aspect of the embodiments of the present invention, the first obtaining module is specifically configured to: receive identifier information of the second device that is sent by the wearable device corresponding to the called object identifier; or receive a service obtaining request sent by the second device, where the service obtaining request includes identifier information of the wearable device corresponding to the called object identifier.

With reference to any one of the third aspect to the fifth implementation manner of the third aspect of the embodiments of the present invention, in a sixth manner of the third aspect of the embodiments of the present invention, the establishment module is specifically configured to: establish, between the first device and the second device, a P2P connection that supports the service type; or forward data corresponding to the service type between the first device and the second device, so that the first device communicates with the second device.

A fourth aspect of the embodiments of the present invention provides a wearable device, including:

a second receiving module, configured to receive a prompt message from a first device, where the prompt message includes a list of second devices supporting a specific service type;

a third receiving module, configured to receive an operation instruction of a user;

a device determining module, configured to determine a second device selected by the operation instruction; and a second sending module, configured to: send identifier information of the selected second device to the first device, so that the first device establishes a communication connection supporting the specific service type to the second device; or send identifier information of the selected second device to a local area network gateway, so that the local area network establishes a communication connection that is between the first device and the second device and that supports the specific service type; or send information about the first device and information about the specific service type to the second device, so that the second device sends a service request to a local area network gateway or the first device to establish a communication connection that is between the first device and the second device and that supports the specific service type.

With reference to the fourth aspect of the embodiments of the present invention, in a first implementation manner of the fourth aspect of the embodiments of the present invention, the operation instruction includes: a gesture instruction for the wearable device, or making the wearable device approach or touch another device.

A fifth aspect of the embodiments of the present invention provides a local area network gateway, including:

a processor, a memory, an input apparatus, and an output apparatus, where the processor is configured to perform the following steps by invoking an operation instruction stored in the memory:

receiving a service request sent by a first device connected in a local area network, where the service request includes at least a called object identifier and a service type;

sending a prompt message to a wearable device corresponding to the called object identifier, where the prompt message includes a list of second devices supporting the service type;

obtaining information about a second device that is selected by a user by using the wearable device; and establishing a communication connection that is between the first device and the second device and that supports the service type, so that the first device communicates with the second device.

With reference to the fifth aspect of the embodiments of the present invention, in a first implementation manner of the fifth aspect of the embodiments of the present invention, before performing the step of receiving a service request sent by a first device connected in a local area network, the processor is further configured to perform the following steps:

storing information about a registered wearable device, where the information about the wearable device includes identifier information of the wearable device and identifier information of a corresponding user; and obtaining location information, capability information, and status information of one or more devices connected in the local area network, where the location information indicates a current location, the capability information indicates a supported service type, and the status information indicates a current online state and/or use state.

With reference to the fifth aspect or the first implementation manner of the fifth aspect of the embodiments of the present invention, in a second implementation manner of the fifth aspect of the embodiments of the present invention, when performing the step of sending a prompt message to a wearable device corresponding to the called object identifier, the processor is specifically configured to perform the following steps:

determining status information of the wearable device corresponding to the called object identifier; and sending the prompt message to the wearable device corresponding to the called object identifier when the status information of the wearable device corresponding to the called object identifier is being used.

With reference to any one of the fifth aspect to the second implementation manner of the fifth aspect of the embodiments of the present invention, in a third manner of the fifth aspect of the embodiments of the present invention, after performing the step of receiving a service request sent by a first device connected in a local area network and before performing the step of sending a prompt message to a wearable device corresponding to the called object identifier, the processor is further configured to perform the following steps:

adding, to the list of second devices, a device that is located within a first preset range of the wearable device corresponding to the called object identifier, that supports the service type, and that is online.

With reference to any one of the fifth aspect to the third implementation manner of the fifth aspect of the embodiments of the present invention, in a fourth manner of the fifth aspect of the embodiments of the present invention, the service type includes at least one of call, picture transmission, or video transmission.

With reference to any one of the fifth aspect to the fourth implementation manner of the fifth aspect of the embodiments of the present invention, in a fifth manner of the fifth aspect of the embodiments of the present invention, when performing the step of obtaining information about a second device that is selected by a user by using the wearable device, the processor specifically performs the following steps:

receiving identifier information of the second device that is sent by the wearable device corresponding to the called object identifier; or receiving a service obtaining request sent by the second device, where the service obtaining request includes identifier information of the wearable device corresponding to the called object identifier.

With reference to any one of the fifth aspect to the fifth implementation manner of the fifth aspect of the embodiments of the present invention, in a sixth manner of the fifth aspect of the embodiments of the present invention, when performing the step of establishing, between the first device and the second device, a communication connection that supports the service type, the processor specifically performs the following steps:

establishing, between the first device and the second device, a P2P connection that supports the service type; or performing data forwarding corresponding to the service type between the first device and the second device.

A sixth aspect of the embodiments of the present invention provides a wearable device, including:

a processor, a memory, an input apparatus, and an output apparatus, where the processor is configured to perform the following steps by invoking an operation instruction stored in the memory:

receiving a prompt message from a first device, where the prompt message includes a list of second devices supporting a specific service type;

receiving an operation instruction of a user;

determining a second device selected by the operation instruction; and sending identifier information of the selected second device to the first device, so that the first device establishes a communication connection supporting the specific service type to the second device; or sending identifier information of the selected second device to a local area network gateway, so that the local area network establishes a communication connection that is between the first device and the second device and that supports the specific service type; or sending information about the first device and information about the specific service type to the second device, so that the second device sends a service request to a local area network gateway or the first device to establish a communication connection that is between the first device and the second device and that supports the specific service type.

With reference to the sixth aspect of the embodiments of the present invention, in a first implementation manner of the sixth aspect of the embodiments of the present invention, the operation instruction includes: a gesture instruction for the wearable device, or making the wearable device approach or touch another device.

It can be seen from the foregoing technical solutions that the embodiments of the present invention have the following advantages: in the embodiments of the present invention, after receiving a service request that is sent by a first device connected in a local area network and that includes a called object identifier and a service type, a local area network gateway sends a prompt message including a list of second devices supporting the service type to a wearable device corresponding to the called object identifier, then obtains information about a second device selected by a user by using the wearable device, and establishes a communication connection that is between the first device and the second device and that supports the service type, so that the first device communicates with the second device. Because a called object and the wearable device have a correspondence, even though whether a called party carries a communications device is unclear and a location of the called party is unknown, service communication between a service initiator and the called party can be accurately established by only sending prompt information including the list of second devices to the wearable device carried by the user and then establishing a communication connection between the first device and the second device selected by the wearable device.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

It should be understood that although terms such as first and second may be used in the embodiments of the present invention to describe devices, the devices should not be limited to these terms. These terms are used to distinguish the devices from each other only. For example, without departing from the scope of the embodiments of the present invention, a first device may also be referred to as a second device. Similarly, the second device may also be referred to as the first device. This is not limited in the embodiments of the present invention.

Figure 1:
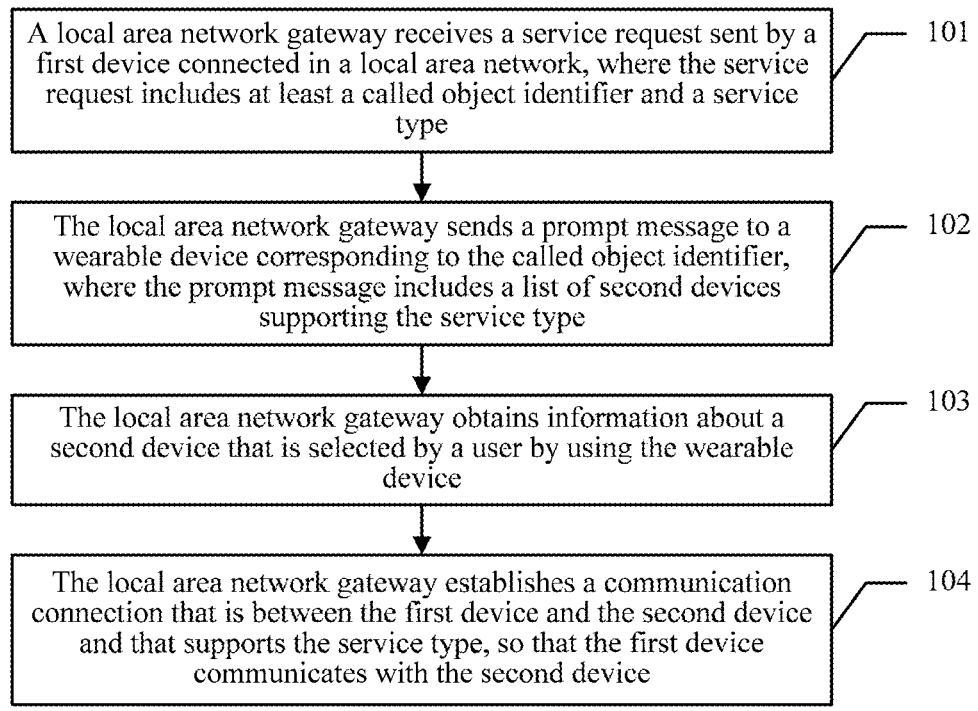
FIG. 1 is a schematic flowchart of a message sending method in a local area network according to an embodiment of the present invention.

Referring to FIG. 1, an embodiment of a message sending method in a local area network in the embodiments of the present invention includes the following steps.

101: A local area network gateway receives a service request sent by a first device connected in a local area network, where the service request includes at least a called object identifier and a service type.

In this step, when a user (a calling party) in the local area network needs to establish service communication with another user (a called party), the calling party may operate any device (a first device) that is in the local area network and that supports the operation to initiate a service request for the called party. The local area network gateway receives the service request sent by the first device connected in the local area network, and the service request includes at least the called object identifier and the service type.

102: The local area network gateway sends a prompt message to a wearable device corresponding to the called object identifier, where the prompt message includes a list of second devices supporting the service type.

In this step, the called object identifier and the wearable device have a correspondence. After receiving the service request including the called object identifier and the service type, the local area network gateway sends the prompt message to the wearable device corresponding to the called object identifier, and the prompt message includes the list of second devices supporting the service type.

103: The local area network gateway obtains information about a second device that is selected by a user by using the wearable device.

It may be understood that the wearable device is carried by the user. After the wearable device receives the prompt message that is sent by the local area network gateway and that includes the list of second devices, the user may select the second device in the list of second devices, and the local area network gateway obtains the information about the second device that is selected by the user by using the wearable device.

104: The local area network gateway establishes a communication connection that is between the first device and the second device and that supports the service type, so that the first device communicates with the second device.

After obtaining the information about the second device, the local area network gateway establishes a communication connection between the first device and the second device, and the communication connection supports a service type included in the service request, so that the first device communicates with the second device, so as to perform service communication between the calling party and the called party.

Because in this embodiment of the present invention, a called object and a wearable device have a correspondence, even though whether a called party carries a communications device is unclear and a location of the called party is unknown, service communication between a service initiator and the called party can be accurately established by only sending prompt information including a list of second devices to the wearable device carried by a user and then establishing a communication connection between a first device and the second device selected by the wearable device, thereby improving efficiency of service communication in a local area network.

Figure 2:
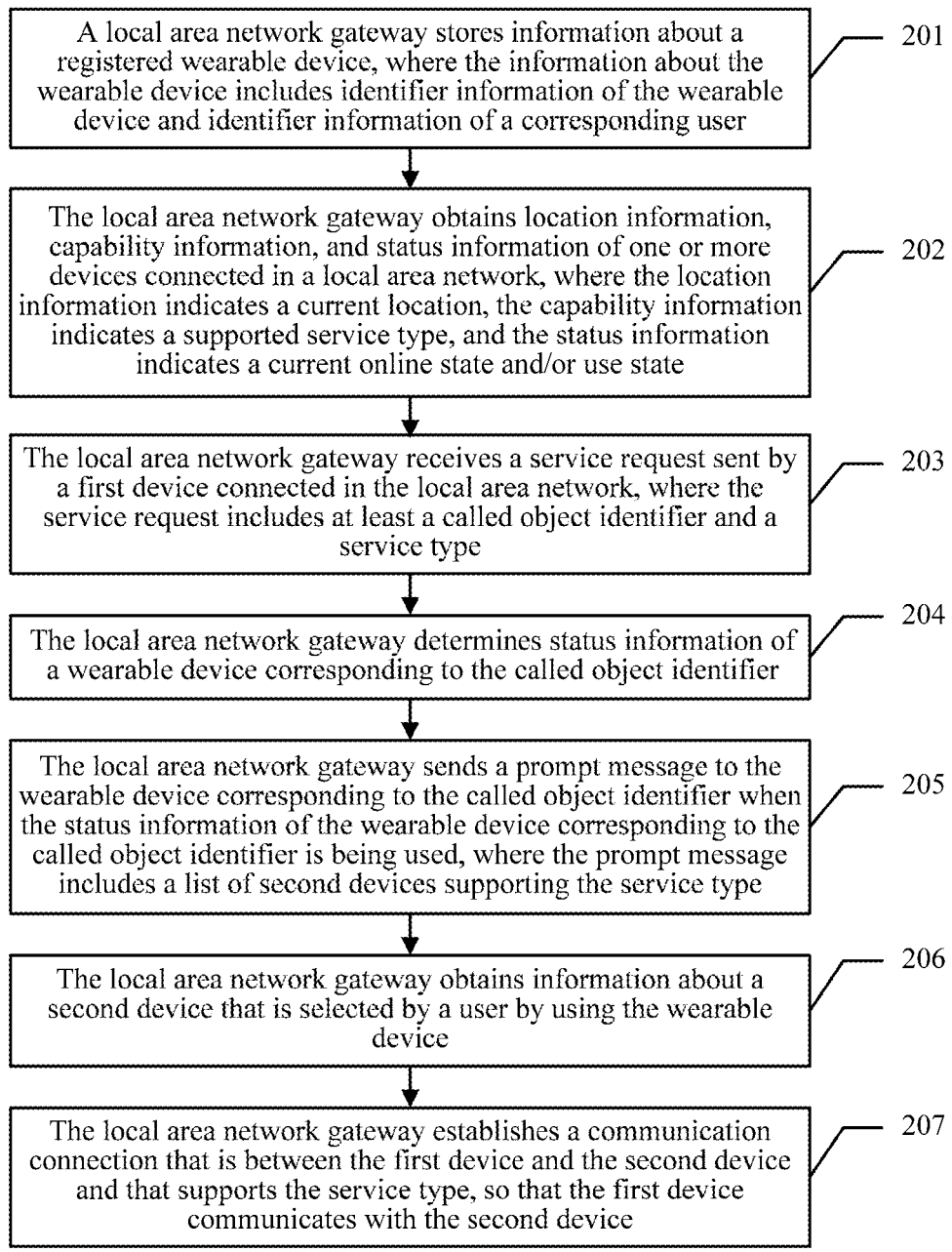
FIG. 2 is another schematic flowchart of a message sending method in a local area network according to an embodiment of the present invention.

In the foregoing embodiment, the called object and the wearable device have a correspondence. In actual application, a local area network gateway may first obtain and store information about a wearable device and information about other devices in a local area network. In addition, before sending a prompt message to the wearable device, the local area network gateway may first determine a status of the wearable device and then perform a subsequent operation. A message sending method in a local area network in the embodiments of the present invention is specifically described below. Referring to FIG. 2, another embodiment of a message sending method in a local area network in the embodiments of the present invention includes the following steps.

201: A local area network gateway stores information about a registered wearable device, where the information about the wearable device includes identifier information of the wearable device and identifier information of a corresponding user.

In this step, identifier information of at least one wearable device may correspond to identifier information of one user, that is, one user may be bound to multiple wearable devices.

Specifically, each user in the local area network may create a username or a user avatar in the local area network gateway, and the username and the user avatar need to be bound to at least one wearable device of the user.

202: The local area network gateway obtains location information, capability information, and status information of one or more devices connected in the local area network, where the location information indicates a current location, the capability information indicates a supported service type, and the status information indicates a current online state and/or use state.

In this step, before obtaining the location information, the capability information, and the status information, the local area network gateway may receive registration of devices. That is, when a device is connected to the local area network for the first time, the local area network gateway may send a registration notification to the device. After receiving the registration notification sent by the local area network gateway, the device automatically registers with the local area network gateway, or the device displays the registration notification. After viewing the registration notification, the user registers the device with the local area network gateway. After registration is completed, the local area network gateway may obtain and save the location information, the capability information, and the status information of the registered device and perform real-time update.

Optionally, obtaining of the location information by the local area network gateway may be implemented by sending a location information obtaining instruction to a device in the local area network. For example, the location information of the device in the local area network may be obtained and saved by using a Get_location( ) action instruction. If the device is a mobile device, when a location of the mobile device changes, the mobile device may report to the local area network gateway that the location changes, the local area network gateway determines a current location of the mobile device and updates and saves location information.

A location change of the mobile device may be detected by using a GPS or a motion sensor built in the mobile device. It should be noted that Get_location( ) action is an example of the location information obtaining instruction in the present invention. An information obtaining instruction is sent by the local area network gateway to a device in the local area network, and an objective/effect of the instruction is that after receiving the instruction, the device in the local area network feeds back/reports location information of the device to the local area network gateway.

Optionally, obtaining of the capability information by the local area network gateway may be implemented by sending GetProtocol( ) action to a device in the local area network by using an M-Search instruction in a UPnP protocol or broadcasting an SSDP message, to obtain a capability of the device in the local area network and determine and save capability information (for example, voice and display) of the device in the local area network. When a new device is added to the local area network, the local area network gateway obtains capability information of the device and updates a device capability list.

Optionally, obtaining of the status information by the local area network gateway may be implemented by sending a status information obtaining request to a device in the local area network. For example, a current status value of a smart home device may be obtained by using a get_status( ) action instruction.

It may be understood that for different devices, the status information may include a current online state and/or use state. The status information of the device is whether the device is used, and for a wearable device, may be whether the device is carried by the user. There are multiple methods of detecting whether the wearable device is carried by the user. For example, there is a detection method using a sensor such as a temperature sensor (the temperature sensor detects whether a temperature of an object contacting the wearable device is a normal temperature of a human body) and a motion sensor (the motion sensor detects whether the wearable device is in a moving state or an active state). This is not limited herein.

It may be understood that in actual application, step 201 and step 202 may be preceding steps that may be completed in advance, and do not need to be performed within a same period as subsequent steps.

203: The local area network gateway receives a service request sent by a first device connected in the local area network, where the service request includes at least a called object identifier and a service type.

In this step, when a user (a calling party) in the local area network needs to establish service communication with another user (a called party), the calling party may operate any device (a first device) that is in the local area network and that supports the operation to open a page of the local area network gateway, select a called object (the called party), and then select a service type.

It should be noted that the called object may be a user or may be multiple users. This is not limited herein. Optionally, the service type may include at least one of call, picture transmission, or video transmission. The call may be a voice call or may be an audio and video call. This is not limited herein.

204: The local area network gateway determines status information of a wearable device corresponding to the called object identifier.

After receiving the service request including the called object identifier and the service type, the local area network gateway may determine the status information of the wearable device corresponding to the called object identifier.

If the status information of the wearable device is being used, it indicates that the wearable device is carried by the called object. It may be understood that when the wearable device is being used, the wearable device is definitely in an online state.

If the status information of the wearable device is being online but not used, it indicates that the wearable device is in a powered-on state but is not carried by the called object.

If the status information of the wearable device is being offline, it indicates that the wearable device is not connected to the local area network.

205: The local area network gateway sends a prompt message to the wearable device corresponding to the called object identifier when the status information of the wearable device corresponding to the called object identifier is being used, where the prompt message includes a list of second devices supporting the service type.

In this step, when the status information of the wearable device corresponding to the called object identifier is being used, that is, when the wearable device is carried by the called object, the local area network gateway sends the prompt message to the wearable device corresponding to the called object identifier, and the prompt message includes the list of second devices supporting the service type.

Optionally, before sending the prompt message to the wearable device, the local area network gateway may simultaneously determine capability information of the wearable device. If that the wearable device does not support the service type is determined, the step that the local area network gateway sends a prompt message to the wearable device corresponding to the called object identifier may be triggered. If that the wearable device supports the service type is determined, the step that the local area network gateway sends a prompt message to the wearable device corresponding to the called object identifier may be triggered, or that a device of the local area network directly establishes a communication connection that is between the first device and the wearable device and that supports the service type may be triggered.

It should be noted that if one called object identifier corresponds to multiple wearable devices, after status information of the wearable devices is determined, only a wearable device whose status information is being used may be selected for subsequent operations.

Optionally, before the local area network gateway sends the prompt message to the wearable device corresponding to the called object identifier, the local area network gateway may add, to the list of second devices, a device that is located within a first preset range of the wearable device corresponding to the called object identifier, that supports the service type, and that is online. In this way, second devices in the list of second devices received by the wearable device are all located around the wearable device, making operations of the user more convenient.

Optionally, before the local area network gateway sends the prompt message to the wearable device corresponding to the called object identifier, the local area network gateway may query location information of the wearable device and a mobile communications device corresponding to the called object identifier. If the wearable device and the mobile communications device are within a preset distance, it indicates that the mobile communications device (for example, a cell phone) of the called object is near the called object, and the local area network gateway may directly establish a communication connection that is between the first device and the mobile communications device and that supports the service type. If the wearable device and the mobile communications device are not within a preset distance, it indicates that the mobile communications device of the called object is not near the called object, and the step that the local area network gateway sends a prompt message to the wearable device corresponding to the called object identifier is triggered.

206: The local area network gateway obtains information about a second device that is selected by a user by using the wearable device.

In this step, there may be multiple manners for the local area network gateway to obtain the information about the second device:

In a manner, the wearable device directly sends identifier information of the second device selected by the user, and then the local area network gateway may receive the identifier information of the second device that is sent by the wearable device corresponding to the called object identifier.

In another manner, the second device selected by the user sends the identifier information of the second device to the local area network gateway, and then the local area network gateway receives a service obtaining request sent by the second device. The service obtaining request includes identifier information of the wearable device corresponding to the called object identifier.

In actual application, either of the foregoing manners may be selected according to actual application and needs. This is not limited herein.

207: The local area network gateway establishes a communication connection that is between the first device and the second device and that supports the service type, so that the first device communicates with the second device.

In this step, there may be multiple cases of establishing a communication connection between the first device and the second device:

In a case, the first device establishes a direct communication connection with the second device. Specifically, the local area network gateway establishes, between the first device and the second device, a P2P point-to-point connection that supports the service type. It may be understood that the P2P connection may be on an IP layer or may be a direct connection of a wireless protocol (for example, WiFi). This is not limited herein.

In another case, forwarding is performed by using the local area network gateway. Specifically, the local area network gateway forwards data corresponding to the service type between the first device and the second device.

In actual application, either of the foregoing scenarios may be selected according to actual application and needs. This is not limited herein.

In this embodiment of the present invention, a local area network gateway may prestore and update in real time location information, capability information, and status information of a device in a local area network, and when sending prompt information to a wearable device, may select, according to locations and statuses of devices, a device that is at an appropriate location and in an appropriate status, and add the device to a list of second devices for selection by a user, thereby reducing useless selection that the user needs to make, improving efficiency of service establishment, and improving performance of human-machine interaction.

Figure 3:
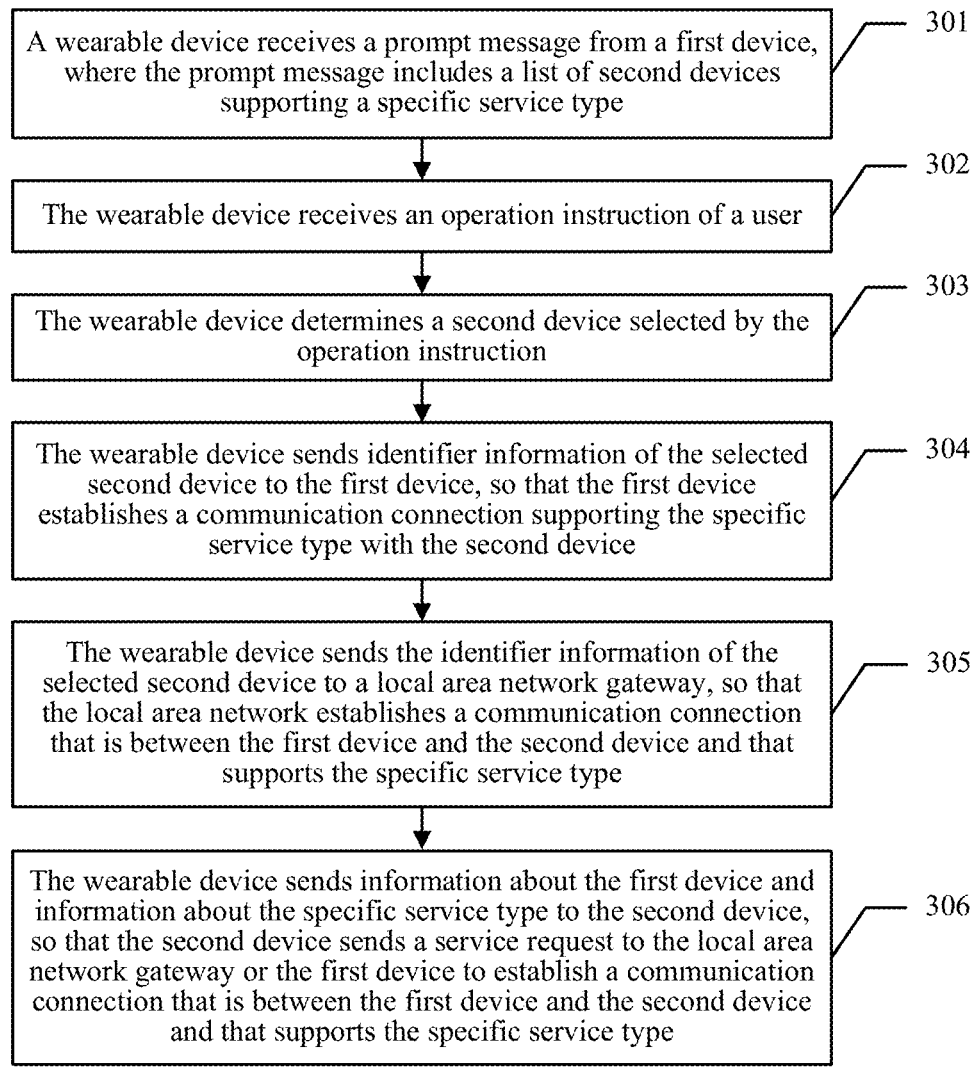
FIG. 3 is another schematic flowchart of a message sending method in a local area network according to an embodiment of the present invention.

In the foregoing embodiment, the local area network gateway obtains information about the second device selected by the user by using the wearable device. A message sending method in a local area network in the embodiments of the present invention is described below from the perspective of the wearable device. Referring to FIG. 3, an embodiment of a message sending method in a local area network in the embodiments of the present invention includes the following steps.

301: The wearable device receives a prompt message from a first device, where the prompt message includes a list of second devices supporting a specific service type.

In this step, the prompt message includes the list of second devices, and may further include session information (for example, a service identifier, a type, or a parameter) of the service type.

It should be noted that the prompt message from the first device may be directly sent to the wearable device by the first device or may be forwarded by another device. This is not limited herein.

It may be understood that after the wearable device receives the prompt message, the prompt message may be presented in multiple manners according to different functions of the wearable device. For example, if the wearable device has a display screen, the prompt message may be directly displayed on the display screen. If the wearable device has a speaker, the prompt message may be played in a form of voice prompt. Another prompt manner such as vibration and color change may be used. This is not limited herein.

302: The wearable device receives an operation instruction of a user.

After the wearable device receives and presents the prompt message, the user may make selection according to a presented list of second devices, and the wearable device may receive the operation instruction of the user.

Optionally, the operation instruction may be a gesture instruction of the user for the wearable device. Specifically, the wearable device may store a preset gesture instruction and a corresponding selection result. For example, it may be set that when the gesture instruction of the user matches the preset gesture instruction, it indicates that the user determines to select a second device closest to the wearable device.

Optionally, the operation instruction may be making the wearable device approach or touch another device, and the device that the wearable device approaches or touches is then determined as the second device selected by the user.

303: The wearable device determines a second device selected by the operation instruction.

After receiving the operation instruction of the user, the wearable device determines, according to the operation instruction, the second device selected by the user.

After determining the second device selected by the user, the wearable device may send the identifier information of the second device to different devices according to actual needs and different applications and may perform any one of steps 304, 305, or 306. This is not limited herein.

304: The wearable device sends identifier information of the selected second device to the first device, so that the first device establishes a communication connection supporting the specific service type to the second device.

After determining the second device selected by the user, the wearable device may send the identifier information of the selected second device to the first device, so that the first device establishes a communication connection supporting the specific service type to the second device.

305: The wearable device sends the identifier information of the selected second device to a local area network gateway, so that the local area network establishes a communication connection that is between the first device and the second device and that supports the specific service type.

Alternatively, after determining the second device selected by the user, the wearable device may send the identifier information of the selected second device to the local area network gateway, so that the local area network establishes a communication connection that is between the first device and the second device and that supports the specific service type.

306: The wearable device sends information about the first device and information about the specific service type to the second device, so that the second device sends a service request to the local area network gateway or the first device to establish a communication connection that is between the first device and the second device and that supports the specific service type.

After determining the second device selected by the user, the wearable device sends the information about the first device and the information about the specific service type to the second device, so that the second device sends the service request to the local area network gateway or the first device to establish a communication connection that is between the first device and the second device and that supports the specific service type.

In this embodiment of the present invention, a wearable device may determine a second device according to an operation instruction of a user, thereby ensuring successful establishment of a communication connection. In addition, the wearable device may send information to different devices according to different needs, to achieve an objective of eventually establishing a communication connection between a first device and the second device, thereby further meeting needs of the user and improving adaptability of the wearable device.

To facilitate understanding, the message sending method in a local area network in the embodiments of the present invention is specifically described below by using a specific application scenario in an environment of a home network.

A local area network gateway in the environment of the home network is set as a home gateway.

Step 1: When a device is connected to a home gateway for the first time, the home gateway sends a registration notification to the device. After receiving the notification, a user registers the device with the home gateway or the device automatically registers with the home gateway. The home gateway saves and updates in real time categories, capabilities, locations, and status information, for example, Device_ (category, capability, location, status) of smart home devices.

Step 2: A family member creates a username/user avatar in a call function in the home gateway. The username and the user avatar need to be bound to at least one wearable device of the user. The username/user avatar has a one-to-one correspondence to a wearable device bound by the user, for example, Username (WearableDevice1, Wearable Device2, . . . ).

Step 3: The home gateway establishes a user equipment management table according to device registration information in step 1 and user registration information in step 2. As shown in Table 1, Table 1 records a status, capability, and location information of a personal device bound by the user.

TABLE 1

| Username | Device | Device Type* | Whether in a local area network | Use state | Capability | Location information |
|---|---|---|---|---|---|---|
| A | Device1 | Wearable | Y | Y | Voice | XX.XX |
|  | Device2 | Wearable | Y | Y | N | XX.XX |
|  | Device3 | Mobile | N | N | Display | XX.XX |

An attribute of a device type in Table 1 may exist or may not exist according to actual needs. This is not limited herein.

Step 4: A user A selects any operable device, opens a page of the home gateway, selects a called object, that is, a user B (a target call object may be one user or may be multiple users), and selects a service type (picture, call, or video).

Step 5: After receiving a service request of the user A, the home gateway searches the user call management Table 1 to find whether a personal device of the user B is in the local area network, so as to determine whether the user B can be called.

If at least one device of wearable devices of the user B is connected in the local area network, the user B can be called. The process turns to step 6.

If none of the wearable devices of the user B is in the local area network, the user B cannot be called, and a feedback is sent to the user A.

Step 6: The home gateway queries capability information of wearable device that can be used by the user B and determines whether the wearable devices have a capability of supporting the service type selected by the user A. If a wearable device that can be used and that supports the service capability exists, the wearable device is determined as a target device of the user B. If a wearable device that can be used and that supports the service capability does not exist, the process turns to step 7.

If a user selects a voice call service, whether a wearable device has a voice call capability is detected. If the user selects a picture service, whether a wearable device has a display capability is detected.

Step 7: If the wearable device that can be used by the user B does not support the service capability, the home gateway sends a new message prompt to the wearable device. After receiving the prompt of the wearable device, the user selects a smart home device nearby and makes the wearable device touch the selected smart home device or sends specific gesture information (a double-click, a shake, and the like).

The selected smart device obtains ID information of the wearable device, and the selected device sends a message receiving request to the home gateway. The request includes ID information of the wearable device. The home gateway verifies the ID information of the wearable device after obtaining the request. After the ID information of the wearable device is verified, the device selected by the user B is determined to be a target device.

Step 8: The home gateway establishes a direct local area network connection between the device used by the user A and the determined target device.

Step 9: The user A and the user B perform service communication by using the devices that are directly connected.

In the foregoing embodiment, a call initiator is a user in the local area network. In actual application, the call initiator may be a user outside the local area network. The message sending method in a local area network in the embodiments of the present invention is described below by using another embodiment, specifically:

Step I: User equipment connected in the local area network receives a message sent by another device outside the local area network (for example, the user equipment receives telephone information).

Step II: When detecting that the user equipment has a new message, a local area network gateway determines a user identifier of the user equipment and a service type of the new message.

Step III: The local area network gateway determines status information of a wearable device corresponding to the user identifier.

Step IV: The local area network gateway sends a prompt message to the wearable device corresponding to the user identifier when the status information of the wearable device corresponding to the user identifier is being used, and the prompt message includes a list of second devices supporting the service type.

Step V: The local area network gateway obtains information about a second device that is selected by a user by using the wearable device.

Step VI: The local area network gateway establishes a communication connection that is between the another device outside the local area network and the second device and that supports the service type, so that the another device outside the local area network communicates with the second device.

In this embodiment of the present invention, by means of forwarding using a local area network gateway, a service call from outside a local area network may be transferred to any device that is in the local area network and that supports a service type of the service call, thereby greatly improving performance of human-machine interaction. For example, a person is at home, and a company colleague calls the person. The person receives a prompt from a wearable device and selects to receive the call by using a television. In this case, a local area network gateway is used as a terminal, and a communication connection is established between a device of the colleague and the television selected by the person, so as to perform a call service.

Figure 4:
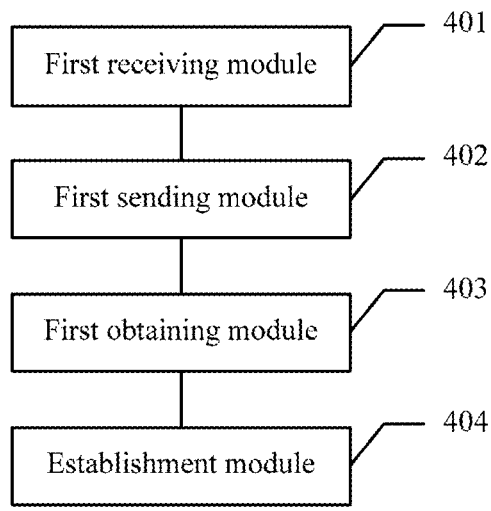
FIG. 4 is a schematic structural diagram of a local area network gateway according to an embodiment of the present invention.

A local area network gateway in the embodiments of the present invention is described below. Referring to FIG. 4, an embodiment of a local area network gateway in the embodiments of the present invention includes:

a first receiving module 401, configured to receive a service request sent by a first device connected in a local area network, where the service request includes at least a called object identifier and a service type;

a first sending module 402, configured to send a prompt message to a wearable device corresponding to the called object identifier, where the prompt message includes a list of second devices supporting the service type;

a first obtaining module 403, configured to obtain information about a second device that is selected by a user by using the wearable device; and an establishment module 404, configured to establish a communication connection that is between the first device and the second device and that supports the service type, so that the first device communicates with the second device.

Because in this embodiment of the present invention, a called object and a wearable device have a correspondence, even though whether a called party carries a communications device is unclear and a location of the called party is unknown, service communication between a service initiator and the called party can be accurately established by only sending, by the first sending module 402, prompt information including a list of second devices to the wearable device carried by a user and then establishing, by the establishment module 404, a communication connection between a first device and a second device selected by the wearable device, thereby improving efficiency of service communication in a local area network.

Figure 5:
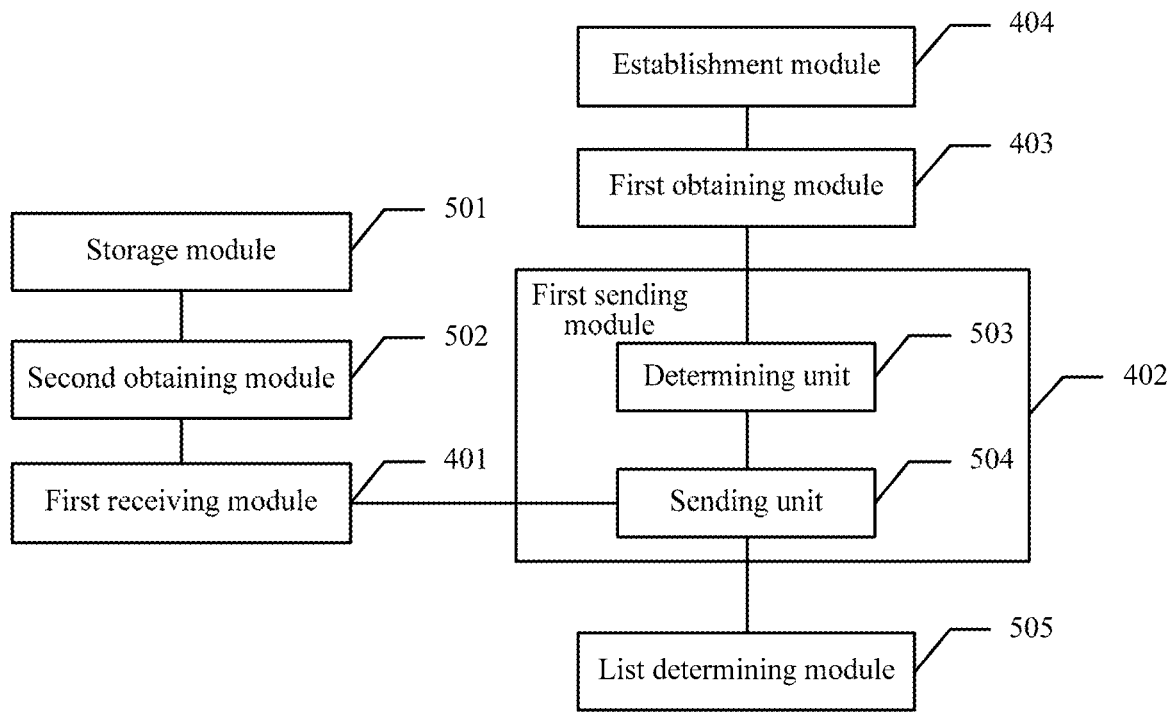
FIG. 5 is another schematic structural diagram of a local area network gateway according to an embodiment of the present invention.

In the foregoing embodiment, the called object and the wearable device have a correspondence. In actual application, a local area network gateway may first obtain and store information about a wearable device and information about another device in a local area network. In addition, before sending a prompt message to the wearable device, the first sending module 402 may first determine a status of the wearable device and then perform a subsequent operation. A local area network gateway in the embodiments of the present invention is specifically described below. Referring to FIG. 5, in another embodiment of a local area network gateway in the embodiments of the present invention, the local area network gateway further includes:

a storage module 501, configured to store information about a registered wearable device, where the information about the wearable device includes identifier information of the wearable device and identifier information of a corresponding user; and a second obtaining module 502, configured to obtain location information, capability information, and status information of one or more devices connected in the local area network, where the location information indicates a current location, the capability information indicates a supported service type, and the status information indicates a current online state and/or use state.

Optionally, the first sending module 402 may specifically include:

a determining unit 503, configured to determine status information of the wearable device corresponding to the called object identifier; and a sending unit 504, configured to send the prompt message to the wearable device corresponding to the called object identifier when the determining unit 503 determines that the status information of the wearable device corresponding to the called object identifier is being used.

Optionally, the wearable device may further include:

a list determining module 505, configured to add, to the list of second devices, a device that is located within a first preset range of the wearable device corresponding to the called object identifier, that supports the service type, and that is online.

Optionally, the service type may include at least one of call, picture transmission, or video transmission.

Optionally, the first obtaining module 403 may be specifically configured to: receive identifier information of the second device that is sent by the wearable device corresponding to the called object identifier; or receive a service obtaining request sent by the second device, where the service obtaining request includes identifier information of the wearable device corresponding to the called object identifier.

Optionally, the establishment module 404 may be specifically configured to: establish, between the first device and the second device, a P2P connection that supports the service type; or forward data corresponding to the service type between the first device and the second device, so that the first device communicates with the second device.

In this embodiment of the present invention, the storage module 501 may prestore and update in real time location information, capability information, and status information of a device in a local area network. When the first sending module 402 sends prompt information to a wearable device, the list determining module 505 may select, according to locations and statuses of devices, a device that is at an appropriate location and in an appropriate status, and add the device to a list of second devices for selection by a user, thereby reducing useless selection that the user needs to make, improving efficiency of service establishment, and improving performance of human-machine interaction.

Figure 6:
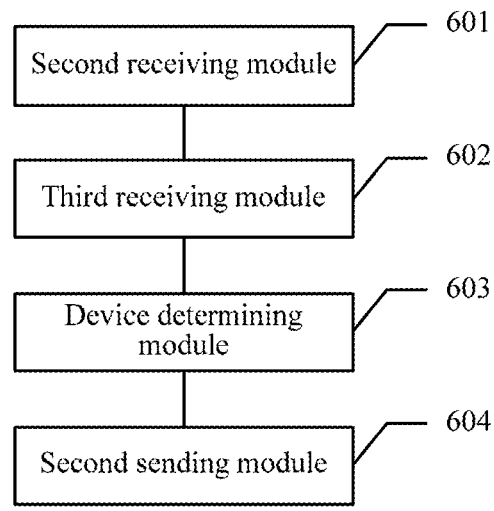
FIG. 6 is a schematic structural diagram of a wearable device according to an embodiment of the present invention.

A wearable device in the embodiments of the present invention is described below. Referring to FIG. 6, an embodiment of a wearable device in the embodiments of the present invention includes:

a second receiving module 601, configured to receive a prompt message from a first device, where the prompt message includes a list of second devices supporting a specific service type;

a third receiving module 602, configured to receive an operation instruction of a user;

a device determining module 603, configured to determine a second device selected by the operation instruction; and a second sending module 604, configured to: send identifier information of the selected second device to the first device, so that the first device establishes a communication connection supporting the specific service type to the second device; or send identifier information of the selected second device to a local area network gateway, so that the local area network gateway establishes a communication connection that is between the first device and the second device and that supports the specific service type; or send information about the first device and information about the specific service type to the second device, so that the second device sends a service request to a local area network gateway or the first device to establish a communication connection that is between the first device and the second device and that supports the specific service type.

Optionally, the operation instruction may include: a gesture instruction for the wearable device, or making the wearable device approach or touch another device. This is not limited herein.

In this embodiment of the present invention, the device determining module 603 may determine a second device according to an operation instruction of a user, thereby ensuring successful establishment of a communication connection. In addition, the second sending module 604 may send information to different devices according to different needs, to achieve an objective of eventually establishing a communication connection between a first device and the second device, thereby further meeting needs of the user and improving adaptability of the wearable device.

Figure 7:
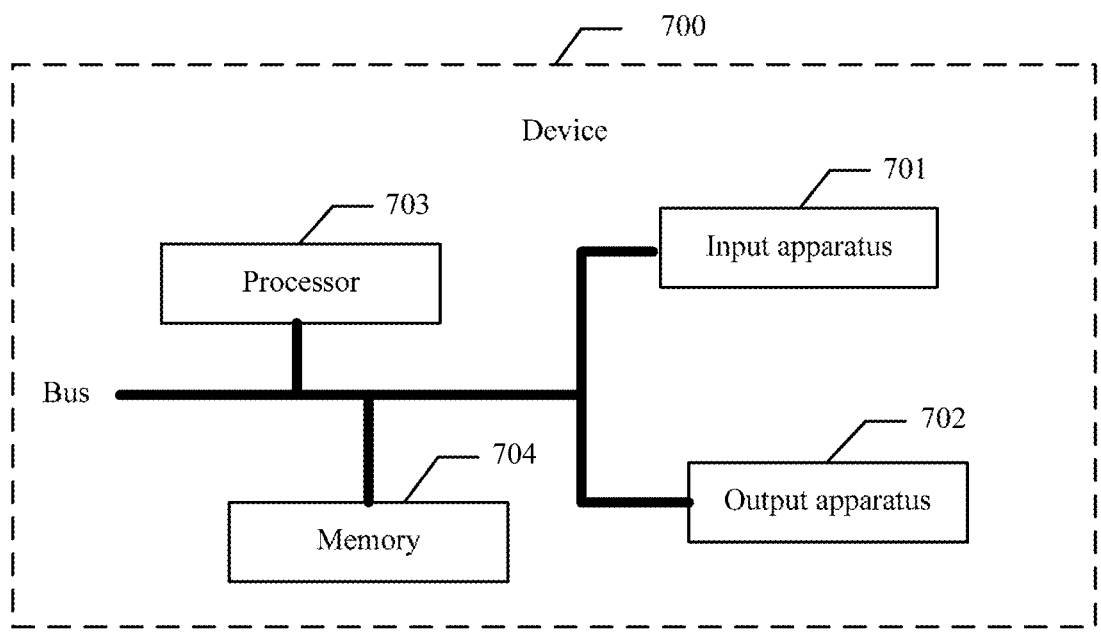
FIG. 7 is a schematic structural diagram of a device according to an embodiment of the present invention.

Referring to FIG. 7, FIG. 7 is a schematic structural diagram of a device 700 according to an embodiment of the present invention. The device 700 may indicate either a structure of a local area network gateway in the embodiments of the present invention, or may indicate a structure of a wearable device in the embodiments of the present invention and includes:

an input apparatus 701, an output apparatus 702, a processor 703, and a memory 704 (there may be one or more processors 703 in the device 700, and one processor 703 is used as an example in FIG. 7). In some embodiments of the present invention, the input apparatus 701, the output apparatus 702, the processor 703, and the memory 704 may be connected by using a bus or in another manner. Connection by using a bus is used as an example in FIG. 7.

When the device 700 indicates a local area network gateway, the processor 703 specifically performs the following steps by invoking an operation instruction stored in the memory 704:

receiving a service request sent by a first device connected in a local area network, where the service request includes at least a called object identifier and a service type;

sending a prompt message to a wearable device corresponding to the called object identifier, where the prompt message includes a list of second devices supporting the service type;

obtaining information about a second device that is selected by a user by using the wearable device; and establishing a communication connection that is between the first device and the second device and that supports the service type, so that the first device communicates with the second device.

In some embodiments of the present invention, before performing the step of receiving a service request sent by a first device connected in a local area network, the processor 703 is further configured to perform the following steps:

storing information about a registered wearable device, where the information about the wearable device includes identifier information of the wearable device and identifier information of a corresponding user; and obtaining location information, capability information, and status information of one or more devices connected in the local area network, where the location information indicates a current location, the capability information indicates a supported service type, and the status information indicates a current online state and/or use state.

In some embodiments of the present invention, when performing the step of sending a prompt message to a wearable device corresponding to the called object identifier, the processor 703 is specifically configured to perform the following steps:

determining status information of the wearable device corresponding to the called object identifier; and sending the prompt message to the wearable device corresponding to the called object identifier when the status information of the wearable device corresponding to the called object identifier is being used.

In some embodiments of the present invention, after performing the step of receiving a service request sent by a first device connected in a local area network and before performing the step of sending a prompt message to a wearable device corresponding to the called object identifier, the processor 703 is further configured to perform the following steps:

adding, to the list of second devices, a device that is located within a first preset range of the wearable device corresponding to the called object identifier, that supports the service type, and that is online.

In some embodiments of the present invention, the service type includes at least one of call, picture transmission, or video transmission.

In some embodiments of the present invention, when performing the step of obtaining information about a second device that is selected by a user by using the wearable device, the processor 703 specifically performs the following steps:

receiving identifier information of the second device that is sent by the wearable device corresponding to the called object identifier; or receiving a service obtaining request sent by the second device, where the service obtaining request includes identifier information of the wearable device corresponding to the called object identifier.

In some embodiments of the present invention, when performing the step of establishing, between the first device and the second device, a communication connection that supports the service type, the processor 703 specifically performs the following steps:

establishing, between the first device and the second device, a P2P connection that supports the service type; or performing data forwarding corresponding to the service type between the first device and the second device.

When the device 700 indicates a wearable device, the processor 703 specifically performs the following steps by invoking an operation instruction stored in the memory 704:

receiving a prompt message from a first device, where the prompt message includes a list of second devices supporting a specific service type;

receiving an operation instruction of a user;

determining a second device selected by the operation instruction; and sending identifier information of the selected second device to the first device, so that the first device establishes a communication connection supporting the specific service type to the second device; or sending identifier information of the selected second device to a local area network gateway, so that the local area network establishes a communication connection that is between the first device and the second device and that supports the specific service type; or sending information about the first device and information about the specific service type to the second device, so that the second device sends a service request to a local area network gateway or the first device to establish a communication connection that is between the first device and the second device and that supports the specific service type.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A message sending method in a local area network, the method comprising:
   receiving, by a local area network gateway, a service request sent by a first device connected in a local area network, wherein the service request comprises at least a called object identifier and a service type;
   sending, by the local area network gateway, a prompt message to a wearable device corresponding to the called object identifier, wherein the prompt message comprises a list of second devices supporting the service type;
   obtaining, by the local area network gateway, information about a second device selected by a user by using the wearable device; and
   establishing, by the local area network gateway, a communication connection between the first device and the second device that supports the service type, to enable the first device to communicate with the second device.

2. The method according to claim 1, wherein before receiving, by a local area network gateway, a service request sent by a first device connected in a local area network, the method further comprises:
   storing, by the local area network gateway, information about a registered wearable device, wherein the information about the wearable device comprises identifier information of the wearable device and identifier information of a corresponding user; and
   obtaining, by the local area network gateway, location information, capability information, and status information of one or more devices connected in the local area network, wherein the location information indicates a current location, the capability information indicates a supported service type, and the status information indicates a current online state and/or use state.

3. The method according to claim 1, wherein sending, by the local area network gateway, a prompt message to a wearable device corresponding to the called object identifier comprises:
   determining, by the local area network gateway, status information of the wearable device corresponding to the called object identifier; and
   sending, by the local area network gateway, the prompt message to the wearable device corresponding to the called object identifier when the status information of the wearable device corresponding to the called object identifier is being used.

4. The method according to claim 1, wherein after receiving, by a local area network gateway, a service request sent by a first device connected in a local area network and before sending, by the local area network gateway, a prompt message to a wearable device corresponding to the called object identifier, the method further comprises:
   adding, by the local area network gateway to the list of second devices, a device located within a first preset range of the wearable device corresponding to the called object identifier, that supports the service type, and that is online.

5. The method according to claim 1, wherein the service type comprises at least one of a call, a picture transmission, or a video transmission.

6. The method according to claim 1, wherein obtaining, by the local area network gateway, information about a second device selected by a user by using the wearable device comprises:
   receiving, by the local area network gateway, identifier information of the second device that is sent by the wearable device corresponding to the called object identifier.

7. The method according to claim 1, wherein obtaining, by the local area network gateway, information about a second device selected by a user by using the wearable device comprises:
   receiving, by the local area network gateway, a service obtaining request sent by the second device, wherein the service obtaining request comprises identifier information of the wearable device corresponding to the called object identifier.

8. The method according to claim 1, wherein establishing, by the local area network gateway, a communication connection between the first device and the second device that supports the service type comprises:
   establishing, by the local area network gateway between the first device and the second device, a point-to-point (P2P) connection that supports the service type.

9. The method according to claim 1, wherein establishing, by the local area network gateway, a communication connection between the first device and the second device that supports the service type comprises:
   forwarding, by the local area network gateway, data corresponding to the service type between the first device and the second device.

* * * * *